US008861517B2

(12) United States Patent
Baker et al.

(10) Patent No.: US 8,861,517 B2
(45) Date of Patent: Oct. 14, 2014

(54) PETAFLOPS ROUTER

(75) Inventors: Zachary Kent Baker, Los Alamos, NM (US); John Fredrick Power, Santa Fe, NM (US); Justin Leonard Tripp, Los Alamos, NM (US); Mark Edward Dunham, White Rock, NM (US); Matthew W. Stettler, Los Alamos, NM (US); John Alexander Jones, Bath (GB)

(73) Assignee: Los Alamos National Security, LLC, Los Alamos, NM (US)

( * ) Notice: Subject to any disclaimer, the term of this patent is extended or adjusted under 35 U.S.C. 154(b) by 500 days.

(21) Appl. No.: 12/763,840

(22) Filed: Apr. 20, 2010

(65) Prior Publication Data
US 2011/0258361 A1 Oct. 20, 2011

(51) Int. Cl.
*H04L 12/28* (2006.01)
*G06F 15/173* (2006.01)

(52) U.S. Cl.
CPC .................................. *G06F 15/17343* (2013.01)
USPC ................ 370/389; 700/201; 326/38; 326/39

(58) Field of Classification Search
None
See application file for complete search history.

(56) References Cited

U.S. PATENT DOCUMENTS

| 6,590,417 | B1 * | 7/2003 | Jones et al. | 326/39 |
| 6,710,623 | B1 * | 3/2004 | Jones et al. | 326/38 |
| 2007/0124565 | A1 * | 5/2007 | Jones et al. | 712/201 |
| 2011/0258361 | A1 * | 10/2011 | Baker et al. | 710/317 |

OTHER PUBLICATIONS

Stettler, Matthew et al., "Modular Trigger Processing, The GCT Muon and Quiet Bit System," Topical Workshop on Electronics for Particle Physics, Prague, Czech Rep., Sep. 2007, pp. 251-255.

Stettler, Matt, "Serial Mesh Based Processing System, Modular Signal Processing Architecture," Presentation at the Workshop on Electronics for Particle Physics, Prague, Czech Rep., Sep. 2007, pp. 1-22.
Wallach, Steve, "Processor Architecture: Past, Present, Future," Convey Computer, Presentation at the Los Alamos Computer Science Symposium. Santa Fe, New Mexico, Oct. 2008, http://www.lanl.gov/conferences/lacss/2008/slides/Wallach.pdf, pp. 1-32.

* cited by examiner

*Primary Examiner* — Robert Wilson
(74) *Attorney, Agent, or Firm* — Christopher P. Whitham; Cochran Freund & Young LLC

(57) ABSTRACT

Disclosed is a method and system for performing operations on at least one input data vector in order to produce at least one output vector to permit easy, scalable and fast programming of a petascale equivalent supercomputer. A PetaFlops Router may comprise one or more PetaFlops Nodes, which may be connected to each other and/or external data provider/consumers via a programmable crossbar switch external to the PetaFlops Node. Each PetaFlops Node has a FPGA and a programmable intra-FPGA crossbar switch that permits input and output variables to be configurably connected to various physical operators contained in the FPGA as desired by a user. This allows a user to specify the instruction set of the system on a per-application basis. Further, the intra-FPGA crossbar switch permits the output of one operation to be delivered as an input to a second operation. By configuring the external crossbar switch, the output of a first operation on a first PetaFlops Node may be used as the input for a second operation on a second PetaFlops Node. An embodiment may provide an ability for the system to recognize and generate pipelined functions. Streaming operators may be connected together at run-time and appropriately staged to allow data to flow through a series of functions. This allows the system to provide high throughput and parallelism when possible. The PetaFlops Router may implement the user desired instructions by appropriately configuring the intra-FPGA crossbar switch on each PetaFlops Node and the external crossbar switch.

20 Claims, 9 Drawing Sheets

FIG. 1 — BLOCK DIAGRAM OF AN EMBODIMENT OF A PETAFLOPS ROUTER

600 FLOW DIAGRAM FOR AN EMBODIMENT OF A MANAGER SYSTEM FOR AN EMBODIMENT OF A PETAFLOPS ROUTER

700 BLOCK DIAGRAM OF AN EXAMPLE EMBODIMENT THAT ADDS & MULTIPLIES EXTERNAL INPUT DATA VECTORS

PETAFLOPS ROUTER

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Computers have been used for many years to perform complex and repetitive calculations for scientists and other computationally intensive users. The most complex calculations and operations have typically been performed on what are commonly referred to as "supercomputers." As computer technology has improved, the capabilities of supercomputers have, correspondingly, also improved. "Petascale" computers are currently considered to be the state of the art supercomputers. A petascale computer is generally considered to be a computer or computer system capable of performing a quadrillion ($10^{15}$) arithmetic operations per second.

Programming a typical supercomputer often requires a user to have intimate knowledge of the core architecture of the computer. Scientists and other computationally intensive end users often must become experts, or work with someone who is an expert, in the use, architecture, and low level programming of a supercomputer in order to use the supercomputer to perform the calculations desired by the end user. Without being a domain expert in supercomputing, or having access to a domain expert in supercomputing available for assistance, the end user will likely find it difficult to achieve maximum performance. Thus, an end user will need to expend time, knowledge, and/or other resources to effectively program the supercomputer, which may be significantly above and beyond the "core" competency of the subject matter of the scientific or other problem being evaluated by the supercomputer.

Further, some supercomputers are created and designed for use in solving a specific problem such that there is only one, or a very limited number of such supercomputers in the world. Thus, the availability of expertise in the use of the problem specific supercomputer is very limited, which may require that the end user become an expert in the in the use, architecture, and low level programming of the problem specific supercomputer as there may not be any available domain experts in the use, architecture, and low level programming of the problem specific supercomputer.

Field Programmable Gate Arrays (FPGAs) started out as prototyping devices, allowing for convenient development of glue-logic-type applications for connecting microchips without high design costs or large numbers of discrete standard logic gates. As the gate density of FPGA devices increased and application specific blocks were added, the applications shifted from glue logic to a wide variety of solutions for signal processing and network problems. Because FPGA devices are controlled by the state of the SRAM bits (Static Random Access Memory bits), the functionality may be changed by modifying the memory state, which can be useful since logic may be customized for a particular application.

FPGAs work by having hundreds of thousands of lookup tables and small routing elements that may be connected together to build larger functions, and fed into registers and memory elements to build applications. An FPGA may implement a wide variety of digital hardware designs. Microprocessors, network switches, software defined radios, and image processing are among the many applications that may be implemented with an FPGA. Typically, applications are designed using Computer-Aided Design (CAD) tools that translate high level HDL (Hardware Design Language) descriptions of the low level computational blocks and data movements into the programming for the routing elements and look up tables of the FPGA. HDL requires data movement and computation to be specified at a cycle-by-cycle level so that the designer is responsible for every bit at every moment in time. HDL is not generally considered to be user friendly. Therefore, traditional FPGA development is expensive and time consuming since an FPGA expert is required and, even with the FPGA expert, the tools may still be difficult to use. Thus, the acceptance of FPGA hardware in high performance computing has been slow. Making use of the full capabilities of the FPGA hardware requires highly skilled FPGA designers with years of experience, which are rarely the typical end users of a supercomputer system.

SUMMARY OF THE INVENTION

An embodiment of the present invention may comprise a method to perform operations on at least one external data input vector comprising: creating a PetaFlops Router Node comprised of a Field Programmable Gate Array (FPGA); implementing within the FPGA of the PetaFlops Router Node an intra-FPGA crossbar switch, a plurality of input vector registers, and a plurality of physical operators, each of the plurality of input vector registers being capable of simultaneously reading and writing; configuring the plurality of physical operators to perform desired arithmetic and logic operations; connecting the physical operators configured to perform desired arithmetic an logic operations to the intra-FPGA crossbar switch, the intra-FPGA crossbar switch being programmable to configure how data is routed into and out of the plurality of physical operators, including configuring intermediate computations on the at least one external data input vector by routing an output of a first physical operator of the plurality of physical operators of the FPGA into an input of a second physical operator of the plurality of physical operators of the FPGA to create intermediate computation input vectors to the intra-FPGA crossbar switch; connecting the at least one external data input vector to the intra-FPGA crossbar switch via an input vector register selected from the plurality of vector registers; connecting the intermediate computation input vectors to the intra-FPGA crossbar switch via additional input vector registers selected from the plurality of input vector registers such that there is an additional input vector register for each intermediate computation input; connecting a manager system to the intra-FPGA crossbar switch such that the manager system manages operation of the intra-FPGA crossbar switch; receiving desired operation instructions for the PetaFlops Node at the manager system; analyzing the desired operation instructions for the PetaFlops Router Node within the manager system to determine which physical operators of the plurality of physical operators of the FPGA are capable of performing the operation instructions; assigning the desired operation instructions for the PetaFlops Router Node within the manager system to the physical operators of the plurality of physical operators of the FPGA determined to be capable of performing the desired operation instructions for the PetaFlops Router Node; setting up the intra-FPGA crossbar switch by the manager system to route the at least one external data input vector and the intermediate computation input vectors in accord with the assignments of the desired operation instructions for the PetaFlops Router Node to the plurality of physical operators of the FPGA such that the desired operation instructions for the PetaFlops Router Node are executed; receiving data from an external source in the at least one external data input vector; performing operations on the at least one external data input vector in the physical operators of the FPGA in accord with the set up of the intra-FPGA crossbar switch; producing at least one final result data output vector based on the at least one external data input vector; and delivering the at least one final result data output data vector externally to a desired location.

An embodiment of the present invention may further comprise a PetaFlops Router that performs operations on at least one external data input vector comprising: a PetaFlops Router Node comprised of a Field Programmable Gate Array (FPGA), the FPGA further comprising an intra-FPGA crossbar switch, a plurality of input vector registers, and a plurality of physical operators implemented within the FPGA, each of the plurality of input vector registers being capable of simultaneously reading and writing, the plurality of physical operators configured to perform desired arithmetic and logic operations, the physical operators configured to perform desired arithmetic an logic operations connected to the intra-FPGA crossbar switch, the intra-FPGA crossbar switch being programmable to configure how data is routed into and out of the plurality of physical operators making up the FPGA, including a configuration of intermediate computations on the at least one external data input vector that routes an output of a first physical operator of the plurality of physical operators of the FPGA into an input of a second physical operator of the plurality of physical operators of the FPGA to create intermediate computation input vectors to the intra-FPGA crossbar switch, the at least one external data input vector connected to the intra-FPGA crossbar switch via an input vector register selected from the plurality of vector registers, the intermediate computation input vectors connected to the intra-FPGA crossbar switch via additional input vector registers selected from the plurality of input vector registers such that there is an additional input vector register for each intermediate computation input; a manager system connected to the intra-FPGA crossbar switch that manages operation of the intra-FPGA crossbar switch; the manager system having an instruction receiving subsystem that receives desired operation instructions for the PetaFlops Node, an instruction analysis subsystem that analyzes the desired operation instructions for the PetaFlops Router Node to determine which physical operators of the plurality of physical operators of the FPGA are capable of performing the operation instructions, an instruction assignment subsystem that assigns the desired operation instructions for the PetaFlops Router Node to the physical operators of the plurality of physical operators of the FPGA determined to be capable of performing the desired operation instructions for the PetaFlops Router Node, and a crossbar setup subsystem that sets up the intra-FPGA crossbar switch to route the at least one external data input vector and the intermediate computation input vectors in accord with the assignments of the desired operation instructions for the PetaFlops Router Node to the plurality of physical operators of the FPGA such that the desired operation instructions for the PetaFlops Router Node are executed; and wherein the intra-FPGA crossbar switch of the PetaFlops Router Node further delivers at least one final result data output data vector externally to a desired location, the at least one final result data output data vector produced based on the at least one external data input vector that receives data from an external data source via performance of operations on the at least one external data input vector in the physical operators of the FPGA in accord with the manager system set up of the intra-FPGA crossbar switch.

DETAILED DESCRIPTION OF THE EMBODIMENTS

Figure 1:
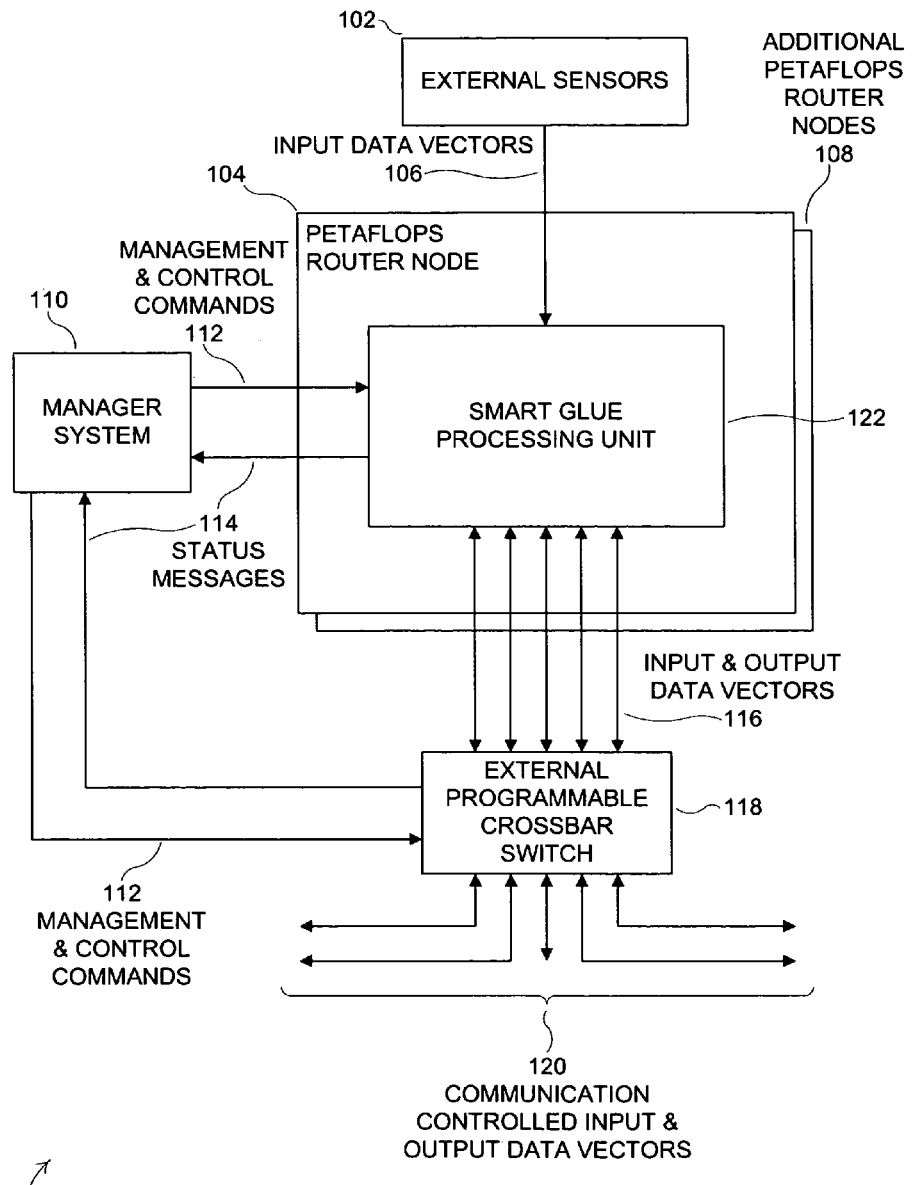
FIG. 1 is a block diagram of an embodiment of a PetaFlops Router.

Achieving high performance on petascale supercomputers is often difficult without detailed architectural knowledge of the computer system including, but not limited to, detailed knowledge of the bandwidth, data delay requirements and low level communication details. The difficulty is often due to the gap between the end goals of computer designers and the end goals of the computer users (i.e., scientists and other computationally intensive users). A typical computer designer may tie together a variety of high-end processors and accelerators to create a potentially very powerful computer system with little regard for how the resulting computer system must be programmed. To properly use the resulting, powerful computer system without an efficient programming paradigm requires intimate knowledge of the components, which makes it difficult for anyone but an expert on the computer system to achieve maximum performance. An end user scientist (or other computationally intensive user) typically prefers to not have to learn the intimate details of a computer system in order to properly utilize the system to perform the calculations desired by the end user scientist. Learning the intimate details of the computer system may severely affect time constraints of the end user scientist as well as the cost in time and money of learning the details of the programming system through mistakes when forced to consider ramifications of every programming decision. The time of the end user scientist is better spent doing science, not struggling through the low level programming details required to properly use a typical supercomputer system.

An embodiment of a PetaFlops Router may provide a high level "widgetized" (i.e., object-oriented core) programming paradigm that is easily understood and implemented by a typical supercomputer end user, such as an end user scientist. Various embodiments may pre-configure a Field Programmable Gate Array (FPGA) with a variety of physical operators, such as multiplier, dividers, adders, and other common arithmetic operations. Various embodiments may also pre-configure the FPGA with more complex operators applicable to a particular type of application, such as a particular integration operation applicable to a particular application. The FPGA operators for various embodiments may be designed one time by an expert FPGA designer, placed into a library and then pre-configured into an FPGA by the end user without a need to redesign the FPGA since the connections between the various operations of the FPGA are created outside of the FPGA programming by the high level programming paradigm the defines the operator input and output connections. For the various embodiments, the connections between the various operators of the FPGA may be defined by the end user in the high level "widgetized" programming language and then implemented in the PetaFlops Router by setting up intra-FPGA crossbar switches located with each FPGA in the system (i.e., with each PetaFlops Router Node) as well as an external crossbar switch connecting the FPGAs/PetaFlops Router Nodes and external devices to each other. Setting up the intra-FPGA and external crossbar switches may also occur at runtime permitting tremendous operational flexibility such as allowing quick and easy mode/calculation changes of the PetaFlops Router hardware connections at runtime.

An embodiment of a PetaFlops Router provides the performance of a highly parallel, custom designed supercomputer while allowing the user to program the calculations in an easy-to use, high level programming paradigm. The PetaFlops Router approaches computing by providing a network architecture and compute decisions that are dynamically customized for a particular application. FPGAs and router technologies (e.g., crossbar/crosspoint switches), including multi-gigabit transceivers and application specific blocks can provide vastly improved performance. By utilizing FPGAs and crossbar switches, the PetaFlops Router can provide greatly improved data transfer rates, computational efficiency, and programmability compared with typical application-specific supercomputer/computing systems.

An embodiment of a PetaFlops Router is based on FPGAs. An FPGA is a reconfigurable integrated circuit technology that is widely used in the telecommunications industry. Current generation FPGAs are capable of providing the performance expected from custom designed integrated circuits while still permitting optimization for many different classes of applications. By incorporating an FPGA into a PetaFlops Router Node, an embodiment may not only be optimized through reconfiguration of the intra-FPGA chip logic, but also by rerouting the flow of information through the network connecting PetaFlops Router Nodes together (i.e., FPGA chips connected via an intra-FPGA chip network). Thus, a PetaFlops Router may quickly and easily adjust the entire computer architecture to a particular application, including the low level network fabric of the PetaFlops Router. The flexibility of providing an adjustable network architecture via the use of the intra-FPGA crossbar switch of the smart glue processing unit and the external crossbar switch makes the PetaFlops Router ideal for a wide range of scales, from a small embedded system to a large high performance (i.e., supercomputer) installation. Each PetaFlops Router Node may be directly connected to sensors, other PetaFlops Nodes, and/or co-processors/accelerators, or the PetaFlops Router may connect to sensors, other PetaFlops Nodes, co-processors/accelerators, additional crossbar switches, and/or other racks through a communication backplane (typically incorporated in a rack computer system). The use of FPGAs to organize and control the movement of data, as well as providing certain custom computational blocks provides a mechanism to harness the power of FPGAs without requiring expert FPGA designers for the lifetime of a system.

FIG. 1 is a block diagram 100 of an embodiment of a PetaFlops Router. The PetaFlops Router may be made up of one 104 or more 108 PetaFlops Router Nodes 104, 108. A PetaFlops Router Node 104 is connected to other PetaFlops Router Nodes 108 through a crossbar switch 118 external to the PetaFlops Router Node 104. Input data vectors 106, 116 may be delivered to the PetaFlops Router Node 104 directly from external sensors 102 or from external devices through the external crossbar switch 118. External devices may be a variety of data producing devices connected to the external crossbar switch 118, including: other external sensors directly connected to the external crossbar switch 118, other computation devices delivering pass through or calculated data, co-processing/accelerators used for specialized/dedicated data processing, other PetaFlops Router Nodes 108, or any other data producing device capable of delivering a data vector (i.e., a stream of data or a data stream) to the external crossbar switch 118. Output data vectors 116 from the PetaFlops Router Node 104 may be delivered to other PetaFlops Router Nodes 108 or other external devices via the external crossbar switch 118.

The PetaFlops Router Node 104 uses the smart glue processing unit 122 to perform desired processing on input data vectors 106 received directly from external sensors 102 and/or input data vectors 116 received via the external crossbar switch 118. The smart glue processing unit is comprised of at least a FPGA, input vector registers (e.g., First In First Out-FIFO registers), and an intra-FPGA crossbar switch (that is separate from the external crossbar switch 118). See the disclosure with respect to FIG. 2 for a more detailed disclosure of the smart glue processing unit 122 of a PetaFlops Router Node 104. An important aspect of the external crossbar switch 118 and the intra-FPGA crossbar switch of the smart glue processing unit 122 is that the crossbar switch is a programmable/configurable crossbar switch. With programmable crossbar switches used for the external crossbar switch 110, it is possible to dynamically control the routing of the data channels 120 into (input) and out of (output) of the external crossbar switch 118 such that the inputs and outputs 120 of the external crossbar switch 118 may be considered to be communication controlled input and output data vectors 120. The manager system 120 sets up, controls, and/or manages the intra-FPGA crossbar switch of the smart glue processing unit 122 and the external crossbar switch 118 by sending management and control messages 112 to the intra-FPGA crossbar switch of the smart glue processing unit 122 and the external crossbar switch 118. The manager system 110 may receive status messages 114 from the intra-FPGA crossbar switch of the smart glue processing unit 122 and the external crossbar switch 118 to permit additional control/management decisions based on the current status of the intra-FPGA crossbar switch of the smart glue processing unit 122 and the external crossbar switch 118.

Figure 2:
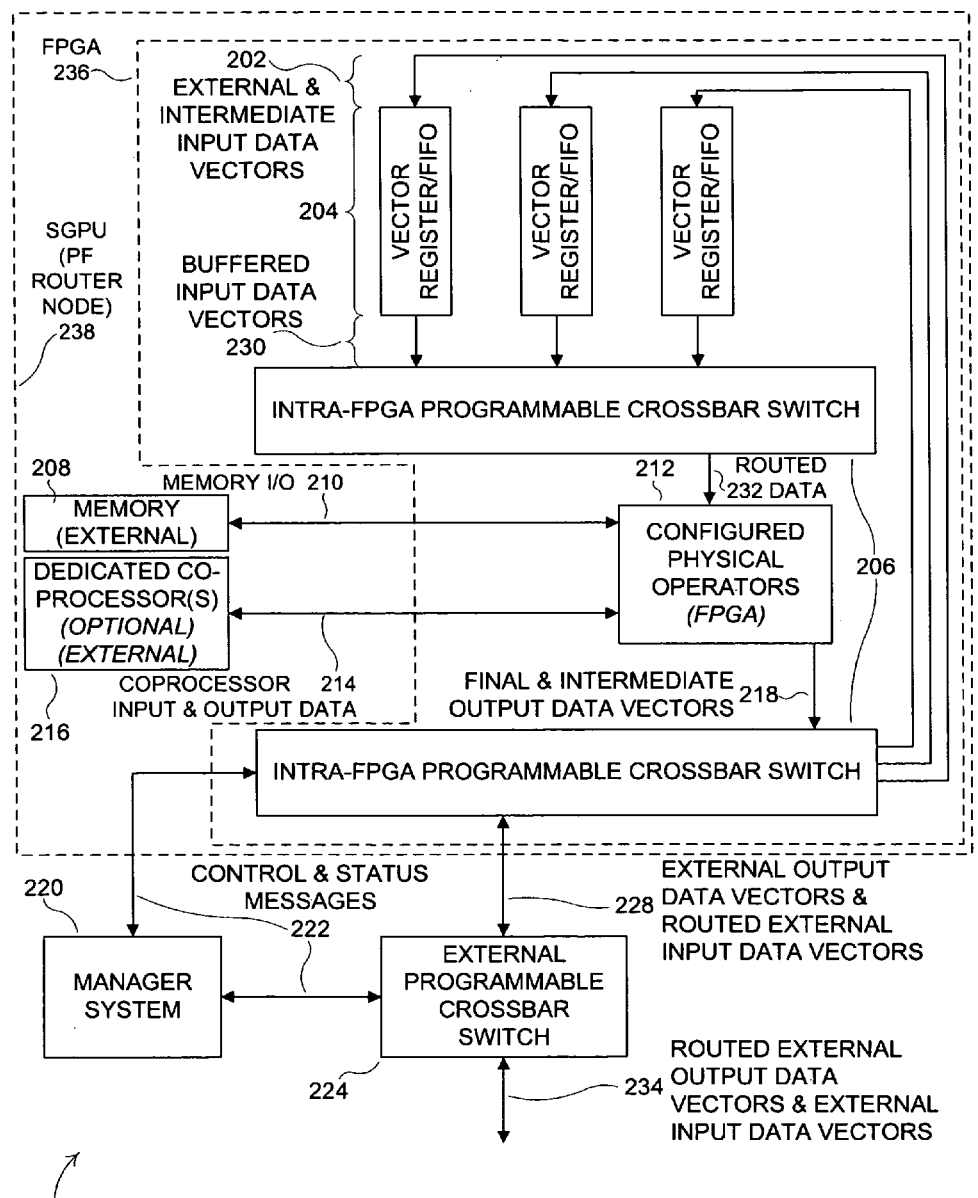
FIG. 2 is a block diagram of an embodiment of a "smart glue" processing unit.

FIG. 2 is a block diagram 200 of an embodiment of a "smart glue" processing unit for a PetaFlops Router Node 238. In the embodiment shown in FIG. 2, the vector registers 204, the intra-FPGA programmable crossbar switch 206, and the configured physical operators 212 are all implemented within the FPGA 236. The memory 208, optional dedicated co-processor(s) 216, manager system 220, and external programmable crossbar switch 224 are external to the FPGA 236. External input data vectors 234 are sent to the external crossbar switch 224, which routes the external input data vectors 228 to the intra-FPGA crossbar switch 206. In the embodiment shown in FIG. 2, the PetaFlops Router Node does not have any inputs received directly from a sensor, but other embodiments of a PetaFlops Router Node 238 may receive data directly from sensors or other data provider devices, including other PetaFlops Router Nodes. The intra-FPGA crossbar switch 206 routes/channels the external input data vectors 228 to the vector registers 204 along with any intermediate calculation results 218 used in other calculations as internal intermediate/external input data vectors 202. The vector registers 204 receive the external and intermediate input data vectors 202 and buffer the external and intermediate input data vectors 202 while the FPGA 236 performs calculations on/with the external and intermediate input data vectors 202 with the configured physical operators 212. The vector registers 204 deliver the buffered external and intermediate input data vectors 230 to the intra-FPGA crossbar switch 206, which routes the external and intermediate input data vectors 232 to the proper physical operator 212 within the FPGA 236 to perform the desired calculation(s). The output data vector(s) (final and intermediate output data vectors) 218 from the physical operators 212 are sent to the intra-FPGA crossbar switch 206. The intra-FPGA crossbar switch 206 routes any intermediate output results 218 to the appropriate vector register 204 as part of the external and intermediate data vectors 202. The intra-FPGA crossbar switch 206 routes any final output data vector results 228 to the external crossbar switch, which delivers the final output data vector results 234 to one or more desired locations.

As an example, if a user desired to multiply two external input data vectors 234 together and then divide the result (an intermediate output/input data vector 218) by a third external input data vector 234, the external crossbar switch 224 would need to route 228 the three input data vectors 234 to the intra-FPGA crossbar switch 206. The intra-FPGA crossbar switch 206 would need to route the first, second and third external input data vectors 228 from the external crossbar switch 224 to three vector registers 204 along internal path/route 202. The vector registers 204 would deliver buffered input data vectors 230 for each of the first and the second external input data vectors 228 to the intra-FPGA crossbar switch 206, which would route the first and second external input data vectors 232 to a multiply physical operator configured 212 in the FPGA 236 to multiply two data numbers together. The intermediate multiplication result 218 of the first and second external input data vectors 228 multiplied together would be delivered 218 to the intra-FPGA crossbar switch 206, which would route the multiplication intermediate result along path 202 to a fourth vector register 204. The third external input data vector 228 and the multiplication intermediate result data vector 218 would be buffered by the vector registers 204 and delivered as buffered input vectors 230 to the intra-FPGA crossbar switch. The vector registers 204 may buffer the third external data stream 228 in a queue until the first intermediate multiply result 218 is available so that the first intermediate multiply result value in the data vector/stream 218 is divided by the first data value of the third external input data vector 228 that has been buffered in the vector register. Thus, the vector registers 204 of an embodiment may automatically adjust for any timing disparities between variables in a calculation without the user needing to adjust a program to account for the timing differences between calculated/intermediate data vectors 218 and raw input data vectors 228. The intra-FPGA crossbar switch 206 would route the third external data vector 232 and the multiplication result vector 232 to a divide physical operator 212 configured in the FPGA 236 to divide one number by another number, where the third external input vector is routed to the divisor of the divide physical operator 212 and the multiplication intermediate result is routed to the dividend of the divide physical operator 212. The final divide result data vector 218 of the intermediate multiplication result divided by the third external input data vector 228 would be delivered 218 to the intra-FPGA crossbar switch 206, which would route the final divide result 218 as an external output 228 to the external crossbar switch 224, which would route the final divide result 234 to at least one desired location, such as a permanent storage location, another PetaFlops Router Node 238, a co-processor/accelerator, and/or any other device capable of receiving the final divide result data vector/stream.

The manager system 220 manages the intra-FPGA crossbar switch 206 on each available PetaFlops Router Node 238 and the external crossbar switch 224 connecting the Peta-Flops Router Nodes 238 to each other and to other external devices. To set up the intra-FPGA crossbar switch 206 and the external crossbar switch 224, the manager system 220 sends control/management messages 222 to the crossbar switches 206, 224. The manager system 220 also monitors the status messages 222 sent by the crossbar switches 206, 224 to track the status of the operators set up by the manager system 220. The manager system 220 receives desired operation instructions for the PetaFlops Router, analyzes the operational instructions to determine which physical operators 212 on the one or more available PetaFlops Router Nodes 238 should connected to perform the desired calculations, and then sets up the intra-FPGA crossbar switches 206 and the external crossbar switch 224 to properly route data between external devices, one or more PetaFlops Router Nodes 238, and/or the physical operators 212 configured into the FPGAs 236 of each PetaFlops Router Node 238. The desired calculations may be entered with little regard to the programmatic structure needed to perform the calculation because the analysis of the desired calculation to locate available physical operators 212 in the FPGAs 236 of the one or more PetaFlops Router Nodes 238 is performed automatically by the manager system 220. The manager system 220 also automatically sets up the intra-FPGA crossbar switches 206 and the external crossbar switch 224, so the end user needs little understanding of the low level computation and/or network architecture of the PetaFlops Router in order to specify and have the PetaFlops Router perform a desired calculation. For instance, in the example described above, the multiply calculation and the divide calculation may be entered as External Input 1 multiplied times External Input 2 with the multiplication result divided by External Input 3. The manager system 220 analyzes the desired instructions and automatically selects and routes connections to the appropriate and available physical operators 212 needed to perform the desired calculation on the FPGA 236.

An embodiment of a PetaFlops Router node 238 may configure one or more physical operators 212 into the FPGA 236. For instance, the FPGA 236 may be configured to provide access to standard add, subtract, multiply, and divide physical operators 212. To permit concurrent calculations, it may be desired to configure the FPGA 236 with multiple instances of common physical operators 212 so that the physical operators 212 may concurrently (i.e., in parallel) perform similar operations on the same or different raw/calculated data vectors 204. The FPGA 236 may also be configured to provide operators 212 that perform more complex calculations such as a Fast Fourier Transform (FFT) (for some FPGAs 236, the FFT may be considered a standard physical operator 212). The limit to the complexity of a physical operator 212 configured within the FPGA 236 is a function of the selected FPGA 236, so very complex physical operators 212 may be designed and incorporated in an FPGA 236 to accommodate the needs of an end user of the PetaFlops Router.

A PetaFlops Router Node 238 may also include local memory 208 and/or one or more dedicated co-processors 216 external to the FPGA 236 in an embodiment of the smart glue processing unit 238. The FPGA 236 may cache data in the local memory 208 that is external to the FPGA or use the memory 208 for any other purpose which may be beneficial to the performance of the desired operations of the physical operators 212 of the FPGA 236. The FPGA 236 may communicate data 210 back and forth with the memory 208 using any desired memory I/O (input/output) communication scheme. The FPGA 236 may also enhance the performance of the physical operators 212 configured into the FPGA 236 by connecting to a dedicated co-processor 216 external to the FPGA 236 to facilitate high performance calculations that are available in the dedicated co-processors/accelerators 216. For instance, while an FPGA 236 is typically good at fixed point arithmetic, a dedicated co-processor 216 may provide significant performance enhancement on single and double precision floating point operations. Other co-processor/accelerators (e.g., a graphics card) 216 may provide enhancements for complex algorithms not as well suited for calculation using the FPGA 236. The FPGA 236 may communicate 214 with co-processors/accelerators 216 via any available communications format. A typical co-processor 216 communication format 214 is the PCI Express data communication format.

Conceptually, the FPGA 236 physical operators 212, intra-FPGA crossbar switch 206, and the external crossbar switch 224, as managed and set up by the manager system 220, serve as "smart glue," not only connecting pieces together, but also making decisions about how the computation will move forward through the hybrid dataflow architecture provided by the crossbar switches 206, 224. The smart glue is more capable than just moving data between computational units. The smart glue may be used to make an embodiment of the PetaFlops Router both self-optimizing and error-tolerant. Link failures or simple congestion (not necessarily network congestion, but computation or memory bandwidth congestion) may be mitigated by having multiple routes to get data in and out of PetaFlops Router Nodes 238 in a manner transparent to the user.

The smart glue processing unit of an embodiment of a PetaFlops Router Node 238 may be conceptually based around an intra-FPGA crossbar switch 206 used for input and output to the physical operators 212 and a series of vector registers 204. The vector registers 204 may be implemented as FIFO registers, which are essentially a data vector register with a read and write port that permit a system to simultaneously read and write to the same vector register 204. The vector registers 204 may be allocated via a renaming scheme that also prevents read/write hazards. The intra-FPGA crossbar switch 206 is a network component that allows connections from any one of the inputs to any number of outputs of the intra-FPGA crossbar switch 206. Data may be moved through the intra-FPGA crossbar switch 206 from computational components 212 of the FPGA 236 to vector registers 204, thus, allowing replication of registers for computations where output results 218 or raw data inputs 228 are used for multiple, but separate calculations.

The vector registers 204 and the intra-FPGA crossbar switch 206 connect the components together that do the actual computations, as well as link the PetaFlops Router Node 238 with other devices, including other PetaFlops Router Nodes 238. An embodiment of a PetaFlops Router may work like a classic vector processor in some cases, namely, when the size of the data vectors is smaller than the size of the vector/FIFO registers 204. However, breaking long data vectors up into blocks is not always necessary since when there are sufficient computational units (i.e., physical operators) 212 and data paths/routes to move the data between the computational units 212, it is possible to start streaming data into the next computation unit 212 before the transfer register is fully populated. Thus, the PetaFlops Router may provide automatic pipelining functionality.

An embodiment may optimize operation by incorporating a combination of the physical operators 212, vector registers 204, and/or the intra-FPGA crossbar switch 206 onto a single chip. Having all, or at least more than one, of the components 212, 204, 206 on a single chip reduces the complexity of data transmission as well as the actual speed of transmission since the transmission length is significantly reduced and the need to interconnect between two chips is eliminated. Each embodiment using a single chip may have potentially hundreds of computation units (i.e., physical operators) 212 configured in the FPGA 236 and several hundred vector registers 204. In one embodiment, the vector registers 204 may be 512×32 data FIFO registers that handle the computation and data movement within one FPGA 212. When communication is required between FPGAs 212 (i.e., between PetaFlops Router Nodes), the system becomes much more complex because the data bandwidth outside of the chips is necessarily less than on-chip bandwidth. The communication between PetaFlops Router Nodes 238 (i.e., between FPGAs 212) may be handled by the external crossbar switch 224 that is operationally similar to the on-chip intra-FPGA crossbar switch 206.

As shown in FIG. 2, a PetaFlops Router Node 238 is not limited to computation using an FPGA 236. An embodiment of a PetaFlops Router Node 238 may include local co-processors/accelerators 216. FPGAs 236 are well suited for signal processing, encryption, and other highly parallel kernels such as genome sequencing. However, certain operations, in particular double-precision floating point operations, are resource intensive and reduce the total amount of parallelism achievable. Co-processors 216 can provide operators that are costly to implement on FPGAs 236. Typical FPGAs 236 have a high volume of input/output pins that are suitable for high bandwidth connections to memory interfaces and which may also be used to connect the FPGA 236 to a floating point accelerator/co-processor 216 or any other custom ASIC (Application Specific Integrated Circuit) 216 to provide application specific co-processing. Multi-gigabit transceivers on an FPGA 236 may be capable of operating in a variety of modes to connect to a variety of serial communication standards (e.g., PCI Express, Serial RapidIO, Infiniband, 1 and 10 Gigabit Ethernet, XAUI, etc.). High speed serial communication has become the approach of choice for high bandwidth point-to-point connections since it is simpler to synchronize a single data line than the dozens of data lines in a parallel communication connection. FPGAs 236 may include dozens of serial transceivers, allowing high aggregate bandwidth, which is useful since many modern graphics processing accelerators and co-processors are connected to their hosts via PCI Express. Accordingly, the PetaFlops Router is capable of combining a large amount of network bandwidth with capable co-processors 216.

Beyond the configured physical operators 212 and attached co-processors 216, an embodiment of a PetaFlops Router Node 238 also includes a highly capable intra-FPGA crossbar (network) switch 206 that operates on at least one high speed serial interconnect. Crossbar switches are typically applied at the node level to interconnect nodes. Placing a crossbar switch 206 on every node allows a significant extension of capability. The intra-FPGA crossbar switch 206 provides a set of $n^2$ connections to n input ports and n output ports of the FPGA 236. Thus any input (internal or external) of the FPGA 236 may be connected to any output (internal or external) of the FPGA 236. Not only may the intra-FPGA crossbar switch 206 provide an independent path/route for each of the physical operator 212 inputs to each of the physical operator 212 outputs, but the intra-FPGA crossbar switch 206 may also efficiently perform a one-to-all communication by connecting a physical operator 212 input/output to all physical operator 212 outputs/inputs. A typical system with a single crossbar switch can connect up to 32 nodes, which is useful, but not scalable. With an intra-FPGA crossbar switch 206 on every PetaFlops Routing Node, essentially any network topology may be built from the collection of nodes. The intra-FPGA crossbar switches 206 may be modified at runtime to act as network switches, or configured by an application for a particular network topology.

Thus, a PetaFlops Router embodiment has the ability to adapt to particular applications. A PetaFlops Router may take application topology into account and adapt algorithm dynamics and knowledge of the system state to optimize performance. Thus, the system may be optimized for a particular class of applications, either by adjusting the intra-FPGA 206 and external 224 crossbar switch connections or by adjustment to physical connections.

A PetaFlops Router may be built using a wide variety of FPGAs 212, crossbar switches 206 & 224, vector registers 204, memory 210, co-processors 216, and manager systems 220. For instance, an embodiment discussed above places the FPGA 212, the intra-FPGA crossbar switch 206, and the vector registers on a single integrated circuit chip to optimize the combined operation of the components. In various embodiments, multiple FPGAs may be incorporated into a single PetaFlops Node 238 to provide additional physical operators on the single PetaFlops Node 238. A particular embodiment of a PetaFlops Router may use a Xilinx Virtex 5 LX110T for the FPGA 212, a Mindspeed M21141 72×72 Crosspoint switch for the intra-FPGA crossbar switch 206, two banks of SDRAM for local memory 210, and a μTCA backplane connection to receive external inputs and deliver the final results externally 234. An embodiment of a PetaFlops Router may also not include the external crossbar switch 224, and instead interconnect PetaFlops Router Nodes 238 through the intra-FPGA crossbar switches 206 on each PetaFlops Router Node 238.

Various embodiments may provide the control and management functions of the manager system 220 detailed herein via an application operating on a computer system (or other electronic devices). The manager system 220 may be implemented using a general purpose computer, a networked computer system, a dedicated computing device, an embedded microcontroller, and/or an embedded computing processor system. The manager system 220 may manage the data-switching of an embodiment of the PetaFlops Router as well as act as the scheduler for assembled program code (i.e., assembled/compiled version of the desired operation instructions). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMs (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Figure 3:
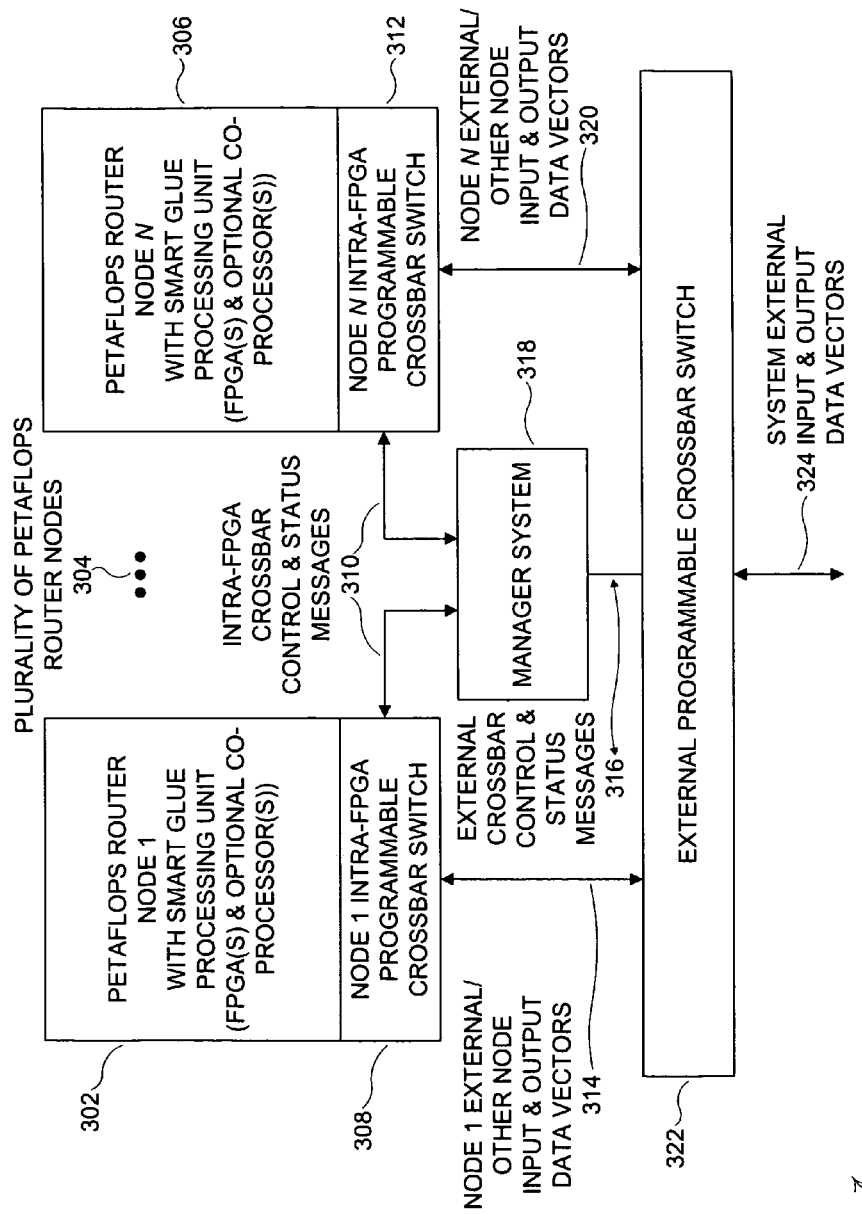
FIG. 3 is a block diagram of an embodiment of a PetaFlops Router with a plurality of PetaFlops Router Nodes.

FIG. 3 is a block diagram 300 of an embodiment of a PetaFlops Router with a plurality of PetaFlops Router Nodes 302-306. A plurality of PetaFlops Router Nodes 304 from a first PetaFlops Router Node 302 to a $n^{th}$ PetaFlops Router Node 306 may be connected together to provide enhanced capabilities for an embodiment of a PetaFlops Router. For example, a sensor phased array may connect the sensors for each phase through a PetaFlops Router Node 302-306 such that there is one PetaFlops Router Node for each sensor phase of the phased array. The manager system 318 controls, manages, and monitors the status of the plurality of PetaFlops Router Nodes 302-306 by sending inter-FGPA crossbar control messages 310 to the node 1 (308) to node n (312) intra-FPGA crossbar switches and receiving status messages 310 from the node 1 (308) to node n (312) intra-FPGA crossbar switches. PetaFlops Router Node 1 (302) may communicate input and output data vectors 314 with other PetaFlops Router Nodes 304-306 via the external crossbar switch 322. PetaFlops Router Node 1 (302) may also receive/send input and output data vectors from/to external devices via the external crossbar switch 322. Other PetaFlops Router Nodes 304-306 may interact together and with external systems similar to PetaFlops Router Node 1 (302). For instance, PetaFlops Router Node n (306) may communicate input and output data vectors 320 with other PetaFlops Router Nodes 302-304 via the external crossbar switch 322. PetaFlops Router Node n (306) may also receive/send input and output data vectors from/to external devices via the external crossbar switch 322. The external crossbar switch 322 may receive/send external system inputs and outputs 324 from/to external devices for delivery to/from the PetaFlops Router Nodes 302-306. Similar to the control and management of the intra-FPGA crossbar switches 308, 312, the manager system 318 controls, manages, and monitors the status of the external crossbar switch 322 by sending external crossbar control messages 316 to the external crossbar switch 322 and receiving status messages 316 from the external crossbar switch 322.

Figure 4:
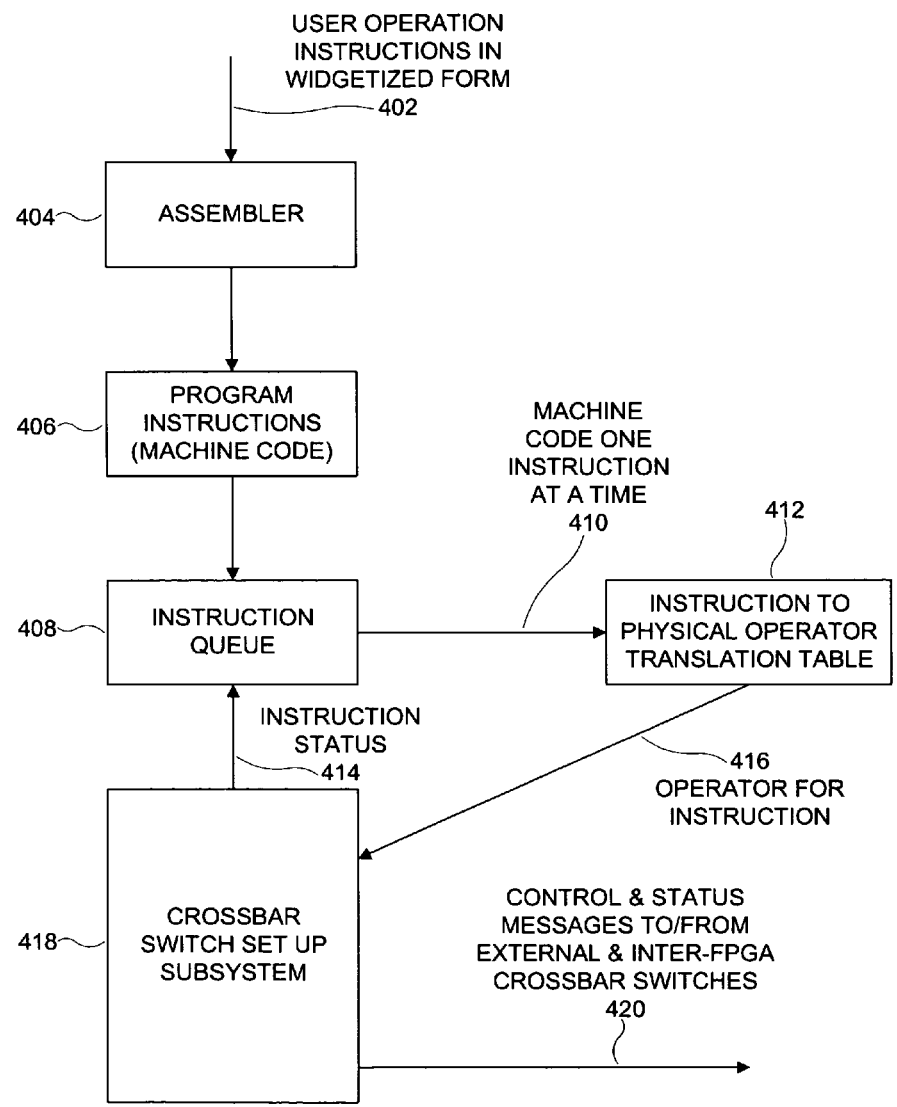
FIG. 4 is a block diagram of the programming process for an embodiment of a PetaFlops Router.

FIG. 4 is a block diagram 400 of the programming process for an embodiment of a PetaFlops Router. A user sends instructions in "widgetized" form 402 to the assembler 404. "Widgetized" instructions are essentially instructions for the connection of data to and from various "widgets." Herein, a widget may be thought of as a general instance of a physical operator on a FPGA. For instance, an FPGA may have ten instances of a two input multiplier operator, ten instances of a five input multiplier operator, five instances of a two input addition operator, two instances of an FFT operator, a hundred instances of a store value operator, and many more operators. A typical PetaFlops Router system will likely have thousands more operators than the few described herein. To "program" the system, an operator may define various widgets and the connections necessary to achieve the desired calculation. For instance, to add two data vectors together, a user might define the system as "Add V3 V1, V2" to indicate that V1 is added to V2 and placed in V3. Thus, a user may define a program in widgetized form using only textual data entry. Another text based example of an embodiment of a set of user desired operation instructions may appear as follows:

```
#get 256 words from address 0 and put it in name R1
FETCH R1, 0, 256
#do an FFT of R1 and put it in R2 (complex output,
2 interleaved data streams)
FFT R2, R1
#get a magnitude of the complex, 256 words, put in R3
ABS R3, R2
#get 256 words from address256 and put it in name R4
FETCH R4, 256, 256
#one word output, dot product of two 256 word vectors
DOTPROD R5, R4, F3
```

To assist a user, a Graphical User Interface (GUI) may be used that permits a user to drag and drop various widgets onto a form and then connect the widgets together as desired. Visual Basic and Visual C++ from Microsoft Corporation are two examples of high level computer programming languages for creating applications on general purpose personal computers that provide widgetized graphical interfaces to create the base structure of a computer program. Typically, the functional operators of the widgets in programming languages such as Visual Basic and Visual C++ are programmed (i.e., defined) by the programmer using a text file written in the syntax of the programming language being widgetized (i.e., Basic or C++). An embodiment will typically only require that the inputs and outputs of the widgets be defined as the actual physical operators are defined/configured on the FPGA by an expert FPGA programmer, without the need by the user to work with the FPGA programming/configuration.

After receiving the desired user operation instructions in widgetized form 402, the assembler 404 converts the user instructions 402 into machine code program instructions 406. The machine code program instructions 406 are a binary instantiation of the user operation instructions 402. The binary/machine code 406 form of the user instructions provides a format that is more quickly and efficiently read by a computer system, computing device, embedded microcontroller, etc. The conversion process from user operation instructions 402 to machine code 406 may also be called compiling or assembling. For an embodiment using the example widgetized program instructions 402 described above, the assembler 404 may also convert the labels into instruction addresses.

The program instructions in machine code 406 are placed into an instruction queue 408 where each instruction, one at a time 410, is translated 412 to a physical operator 416 that is available on an FPGA. An embodiment may read the program instructions in machine code 406 into the instruction queue 408 at runtime. An embodiment may hold only a section/portion of the machine code program instructions 406 in the instruction queue 408 at any given time. The section boundaries for what an embodiment may hold in the instruction queue 408 may reach from the earliest instruction that has yet to be executed to the last instruction that could be executed. Thus, for an embodiment, there may be a head and a tail that represent the potential instructions that need to be executed.

Various embodiments may implement the programming process in different ways. An embodiment may perform the functions of the assembler 404 to create the machine code 406 on a computer system separate and distinct from the manager system described herein. Another embodiment may perform the functions of the assembler 404 on the manager system. The instruction queue 408, instruction to operator translation 412, and the crossbar switch set up subsystem are part of the manage system described herein.

When an instruction in the instruction queue 408 is inspected by the manager system, several conditions may be checked. First, the instruction to operator translation table 412 may be checked (see also, the disclosure with respect to FIG. 5 herein). For an embodiment, the instruction to operator translation table 412 holds the translation from a program instruction code 410 to the physical operator location in the FPGA. The instruction to physical operator translation table 412 is included because the physical operators in FPGAs are not static/fixed. Different instantiations of an FPGA may be different, having varying numbers, locations, and types of operators. For an embodiment, the instruction to physical operator translation table 412 gives the physical location of the operator 416, which allows the crossbar switch manager subsystem 418 to determine if the physical operator 416 is already in use. If the physical operator 416 is already in use, the crossbar switch set up subsystem 418 may check to see if any other physical operators matching the instruction are available. If another physical operator is not available, the crossbar switch set up subsystem 418 may move to the next instruction 410 in the instruction queue 408. If a physical operator 416 is available, the crossbar switch set up subsystem 418 may check to see if data will soon be available. If data is soon to be available, the crossbar switch set up subsystem 418 may then issue commands 420 to set up the intra-FPGA and external crossbar switches in the system to appropriately route raw input data vectors and intermediate result vectors to the assigned physical operator in accord with the program instruction 410. The intra-FPGA and external crossbar switches report the status 420 of the set up and execution of the routing and calculation to the crossbar switch set up subsystem 418. If the status 420 of a program instruction 410 is reported by the crossbar switches as complete, the crossbar switch set up subsystem 418 may report the complete instruction status 414 to the instruction queue 408 so that the instruction queue 408 may remove the completed program instruction 410.

Generally, the crossbar switch set up subsystem 418 of an embodiment attempts to connect as many instructions 410 to physical operators 416 as possible to enable parallel operation that provides the fastest computation execution as possible. Program instructions 410 do not necessarily need to be processed in a serial fashion. That is, program instructions 410 may be processed in any order, as long as there are not dependencies from one instruction 410 to another 410. For instance, an instruction 410 adding two inputs together may be processed before or after an instruction 410 multiplying two inputs together, even if it is the same two inputs. However, an instruction 410 multiplying a third input by the addition of the two inputs is dependent on the first two inputs being added together. Thus, the dependent instruction 410 may need to be set up after the instruction 410 from which the dependent instruction 410 depends. Generally, since the operations are performed on data vectors (i.e., data streams), the dependent instruction 410 may be executed in parallel on a physical operator with the parent instruction 410, but with the dependent instruction 410 being scheduled such that the computation of the dependent physical operator is an appropriate number of data cycles behind the parent physical operator. An embodiment may handle the scheduling of the dependent physical operator by appropriately setting up the input vector registers of the data vectors feeding the dependent physical operator. In some cases, it may be necessary for an operation instruction 410 to complete all computations on a data vector before beginning execution of a second operator. Thus, the crossbar switch set up system 418 may wait for a complete status 420 from a physical operator executing a first instruction 410 before setting up the crossbar switches to connect and execute the second operator. For instance, a sensor may have multiple modes that require different processing and the system may not perform the operations/calculations for a second mode until the operations/calculations for the first mode are complete.

Another dependency example may be based off of the following instructions:

|   |       |          |
|---|-------|----------|
| 0 | STORE | R1 10    |
| 1 | STORE | R2 20    |
| 2 | ADD   | R3 R1 R2 |
| 3 | MULT  | R4 R3 R3 |

In the example instructions, the number 10 is stored in R1 and the number 20 is stored in R2. R3 then receives the value of R1 (10) plus R2 (20). The storage instructions for R1 and R2 may be executed in parallel. If the crossbar switch set up subsystem 218 has scheduled instructions 0 and 1 to be executed and knows the status of the set up, then the crossbar switch set up subsystem 218 knows that the dependencies for instruction 2 will be satisfied. Thus, the crossbar switch set up subsystem 218 may then schedule instruction 2. The vector registers/FIFOs will wait until the data is valid for instruction number 2 before executing without need for further interference from the crossbar switch set up subsystem 418 or other subsystems of the manager system. The ability of an operator on the FPGA to wait until the operator's data is ready and then automatically start receiving requested data from the vector registers/FIFOs allows an embodiment of a PetaFlops Router to build hardware pipelines with very little overhead. For the current example, the MULT operator may take data directly from the output of the ADD operator. If the operators are working on long vectors of data, the outputs of the ADD operator may stream into the MULT operator without the need to break up the data vector or wait for the ADD operator to complete processing the entire data vector. In a traditional processor, the ADD operator would have to complete processing the entire vector before the MULT operator could start processing.

Generally, to program an embodiment of the PetaFlops Router, the user describes what is desired for the system to do in terms of high level, sequential operations. The system then decides how to extract parallelism and efficiently execute the program on the FPGA(s) and/or co-processor(s). Thus, the PetaFlops Router handles the underlying issues of timing and operator scheduling and a PetaFlops Router end user is relieved from the complex, time consuming, and difficult task of configuring a traditional supercomputer. At the node level, the PetaFlops Router programming approach builds up components into functional templates, and then efficiently connects the templates/components through the on-node intra-FPGA crossbar switch structure, allowing an end user to program in an easy, high level fashion. An end user interested in building a signal-processing application might want a collection of FFT blocks, CORDIC cores (for trigonometric functions and exponentials), and matrix/vector units. An image-processing user might want some of the same cores, plus windowing operators and other support for two dimensional (2-D) data. An embodiment may make the various physical operator cores available as firmware libraries for the FPGA(s), built to natively interface with the PetaFlops Router. Memory load and stores, as well as data movement between devices and co-processors implementing some other advanced functionality may all be controlled within an embodiment of a PetaFlops Router.

An embodiment of the PetaFlops Router programming framework may be built on a language that is familiar to anyone with a background in high level parallel programming. However, instead of thinking in terms of explicit scheduling and element-by-element movement and computation, computation may be scheduled when computation data is ready, and data is moved as appropriate for scheduled computations. Hence, a user may program operations in a way that makes sense for a user (e.g., a scientist), and the PetaFlops Router handles the underlying issues of timing and operator scheduling. Unlike classic notions of a vector computer, the PetaFlops Router may have dozens of functions/operators operating on a data stream/vector at one time, with the functions/operators being capable of being highly complex (like an FFT or layered matrix multiply). Thus, vast parallelism is permitted whereas a traditional computer system may only execute a few multiplies or adds in a given cycle.

Figure 5:
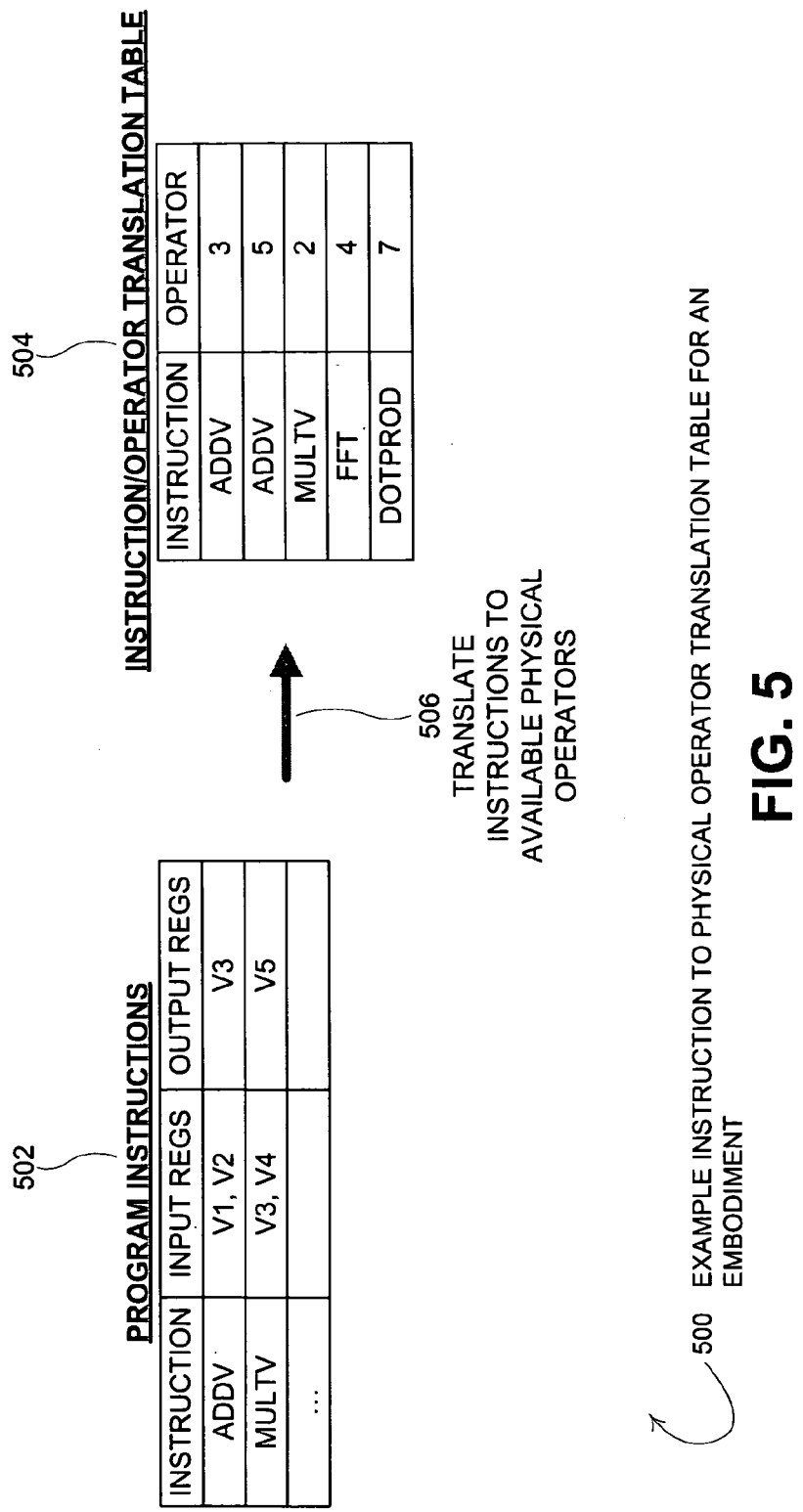
FIG. 5 is an example diagram of a programming instruction to physical operator translation table for an embodiment.

FIG. 5 is an example diagram of a programming instruction to physical operator translation table 504 for an embodiment. The programming instructions 502 (e.g., an ADDV—add variables and a MULT V—multiply variables) may be translated 506 to physical operators using the instruction/operator translation table 504. In the example shown in FIG. 5, the ADDV instruction may be assigned to operator numbers 3 or 5 of the FPGA(s) and the MULTV instruction may be assigned to physical operator number 2 of the FPGA(s).

Figure 6:
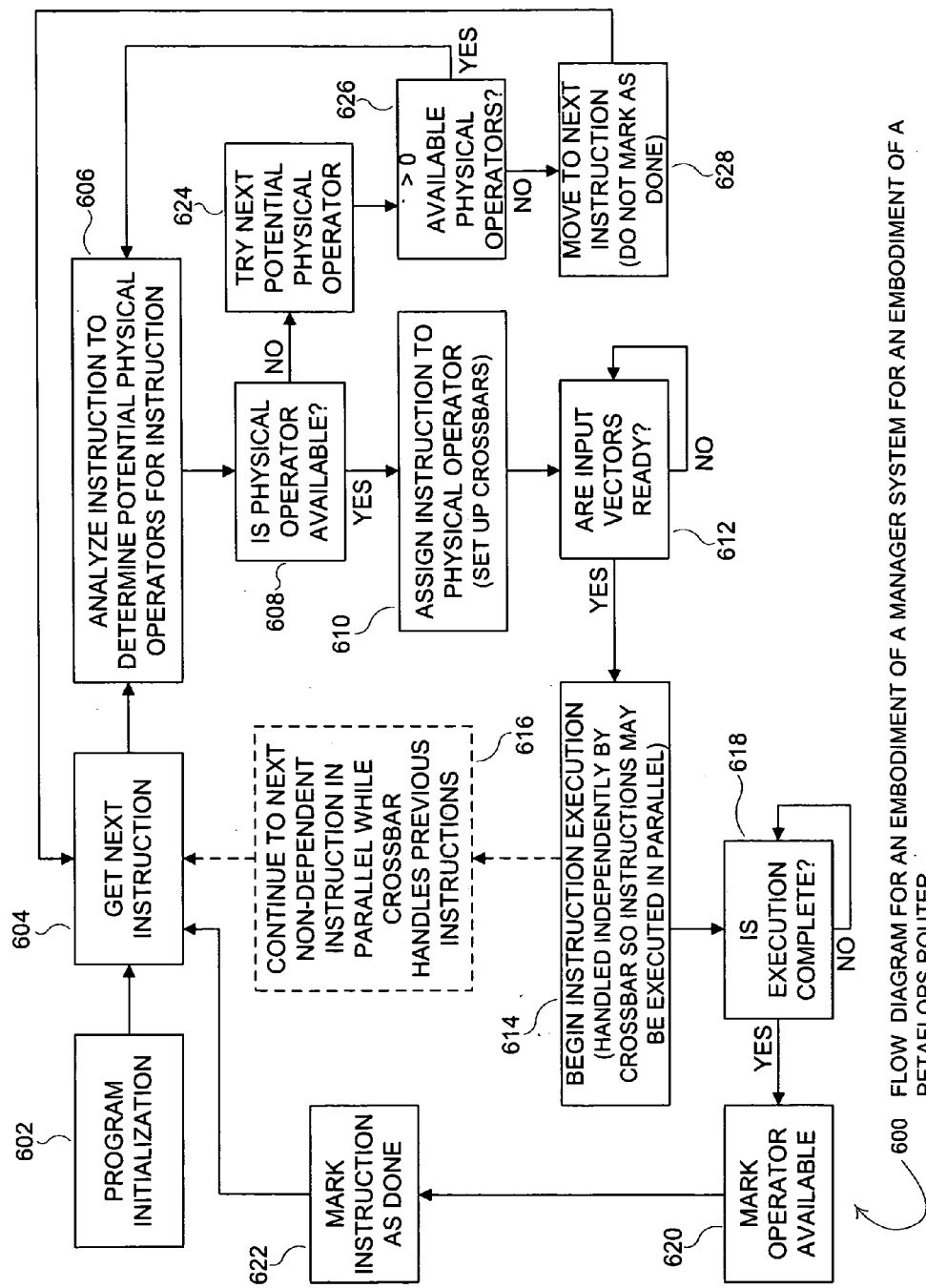
FIG. 6 is an operational flow diagram of the manager system operation for an embodiment of a PetaFlops Router.

FIG. 6 is an operational flow diagram 600 of the manager system operation for an embodiment of a PetaFlops Router. Program flow starts with program initialization 602. At step 604, the system gets the next instruction to process. At step 606, the system analyzes the instruction to determine potential physical operators that are capable of performing the instruction. At step 608, the system determines if the selected physical operator is available. If the selected physical operator is not available, the system moves to step 624 to try the next physical operator. At step 626, the system evaluates if there more than zero physical operators still available to assign to the instruction (i.e., are there any instruction capable physical operators available to assign to the instruction). If there are not any physical operators available to assign to the instruction, the system returns to step 604 to get and process the next instruction. If there are still available physical operators capable of performing the instruction, the system returns to step 606 to select a different available physical operator. If the physical operator is available at step 608, then the system assigns the physical operator to the instruction and sets up the intra-FPGA and external crossbar switches accordingly at step 610. At step 612, the system evaluates whether the input data vectors are ready for the operator. If the input data vectors are not ready the system waits and continues to evaluate whether the input data vectors are ready at step 612 until the input data vectors are ready. When the input data vectors are ready, the system moves to step 614 and begins the instruction/operator execution. The instruction/operator execution is handled independently by the intra-FPGA and external crossbar switches such that additional instructions may be handled in parallel as long as the additional instruction is not dependent on the full and complete execution of any previous instructions (see also the disclosure with respect to FIG. 4). At step 616, the system continues to the next non-dependent instruction by returning to step 604 while the crossbar switches execute the previous instructions in parallel. At step 618, the crossbar switches monitor the execution status of each operator. If the operator has not completed execution, then step 618 is repeated until operator execution is complete. When operator execution is complete, the crossbar switches deliver the complete status to the system and, at step 620, the system marks the physical operator as being available. At step 622, the system marks the instruction as done and moves on to the next instruction at step 604. The next instruction after step 622 may include instructions that are dependent on the completion of the currently completed instruction.

Figure 7:
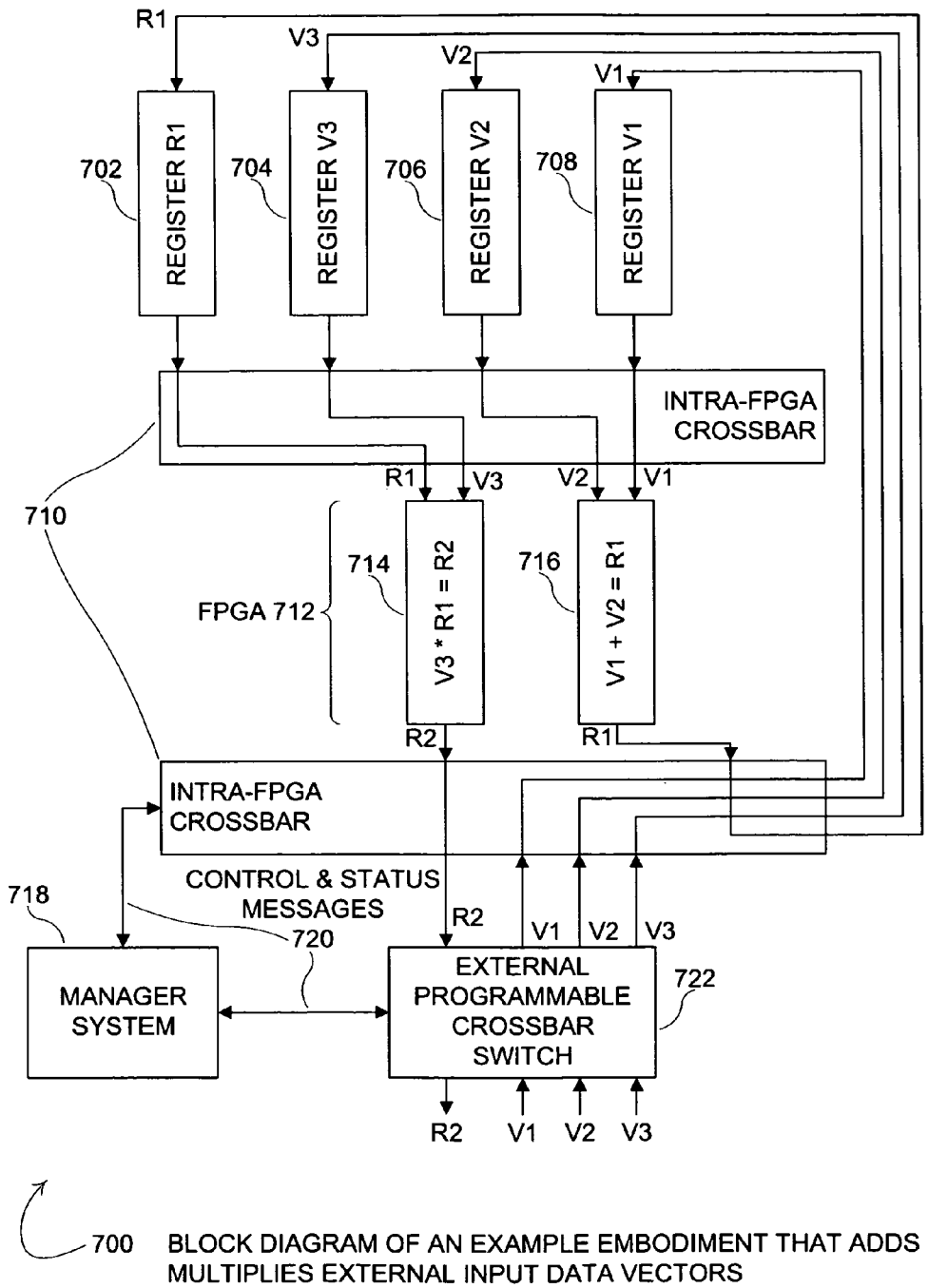
FIG. 7 is a block diagram of an example embodiment that adds and multiplies external input data vectors.

FIG. 7 is a block diagram 600 of an example embodiment that adds and multiplies external input data vectors V1, V2 and V3 according to the equation: result=(V1+V2)*V3. The external crossbar switch 722 receives input data vectors V1, V2 and V3 from an external source. The external crossbar switch routes input data vectors V1, V2 and V3 to the intra-FPGA crossbar switch 710. The intra-FPGA crossbar switch 710 routes input data vector V1 to vector register V1 (708), input data vector V2 to vector register V2 (706), and input data vector V3 to vector register V3 (704). Vector register V3 (704) queues the V3 data vector in a FIFO queue of vector register V3 (704) until the result of the addition operator 716 of the FPGA 712 is available to deliver to the multiplier operator 714 of the FPGA 712. Vector register V1 (708) delivers a buffered version of V1 to intra-FPGA crossbar switch 710. Vector register V2 (706) delivers a buffered version of V2 to intra-FPGA crossbar switch 710. The intra-FPGA crossbar switch 710 routes the buffered versions of V1 and V2 to the inputs of the addition operator 716. The addition operator 716 of the FPGA 712 adds V1 to V2 and produces an addition result data vector, R1, which is a streaming data result vector of the addition of data vectors V1 and V2. The addition result data vector R1 is delivered to the intra-FPGA crossbar switch 710 which routes the addition result data vector R1 to vector register R1 (702). Vector register V3 (704) delivers a buffered version of V3 to intra-FPGA crossbar switch 710. The FIFO queue of vector register V3 has been buffering the data values of input data vector V3 until the addition result data vector R1 is available such that the V3 input data vector/stream values are delivered to the multiplier operator 714 in a time-corresponding manner with the addition result data vector/stream R1 values. Vector register R1 (702) delivers a buffered version of R1 to intra-FPGA crossbar switch 710. The intra-FPGA crossbar switch 710 routes the buffered versions of V3 and R1 to the inputs of the multiplier operator 714. The multiplier operator 714 of the FPGA 712 multiplies V3 times R1 and produces a multiplier result data vector, R2, that is a streaming data result vector of the multiplication of data vectors V3 and R1. The multiplier result data vector R2 is delivered to the intra-FPGA crossbar switch 710 which routes the final multiplier result data vector R2 to the external crossbar switch 722. The external crossbar switch 722 routes the multiplier result data vector R2 to one or many desired external locations. The manager system 718 sets up the intra-FPGA crossbar switch 710 and the external crossbar switch 722 by sending control message 720 as necessary to route the data vectors V1, V2, V3, R1, and R2 to deliver the desired result to the desired external locations. The manager system 718 also monitors the intra-FPGA crossbar switch 710 and the external crossbar switch 722 for status messages 720 to potentially reroute the data vectors V1, V2, V3, R1, and/or R2 if there are error status messages 720, and/or to mark the operation as complete if there is a complete status message 720.

Various embodiments of the PetaFlops Router may be used in a wide variety of applications. For instance, an embodiment of the PetaFlops Router may be used to simulate Quantum Chromodynamics (QCD), which is a fundamental theory of nature. QCD is a mathematical formulation of the interactions between quarks and gluons, which bind together to make up neutrons and protons. Large scale simulations of the theory are necessary to calculate a number of the properties of QCD and an embodiment of the PetaFlops Router is an ideal choice to perform the necessary calculations. Other potential applications for an embodiment of a PetaFlops Router include, but are not limited to: signal processing, sensing and remote measurement; radio frequency (RF) sensing for use in electronics warfare and signals intelligence; phased array sensors/sensing; beamforming, modeling/simulation of 2-D, 3-D and 4-D space and time; and many other computationally intensive calculations, operations, and/or applications.

Figure 8A:
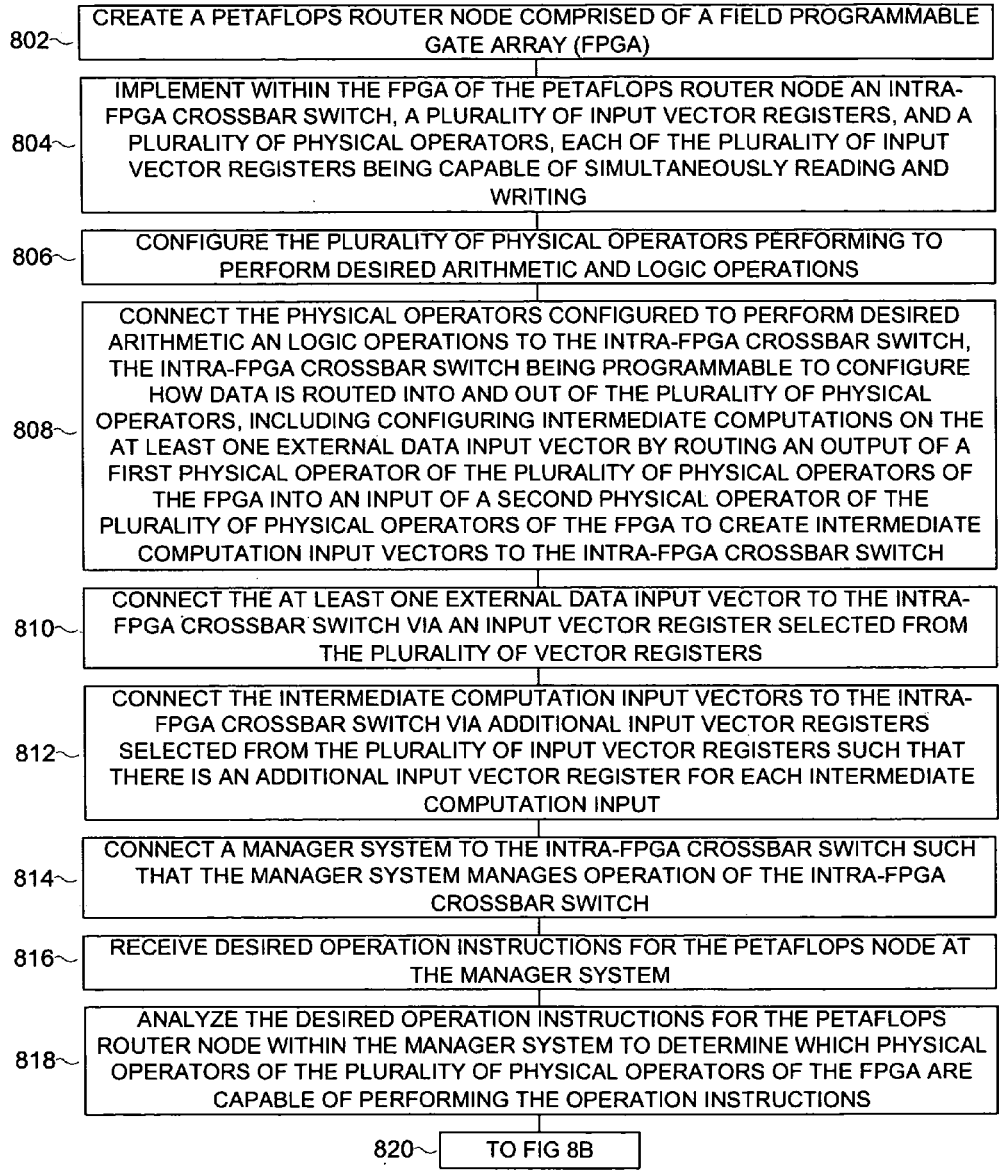
FIGS. 8A and 8B are pages 1 and 2 of a process diagram of an embodiment of a PetaFlops Router.
Figure 8B:
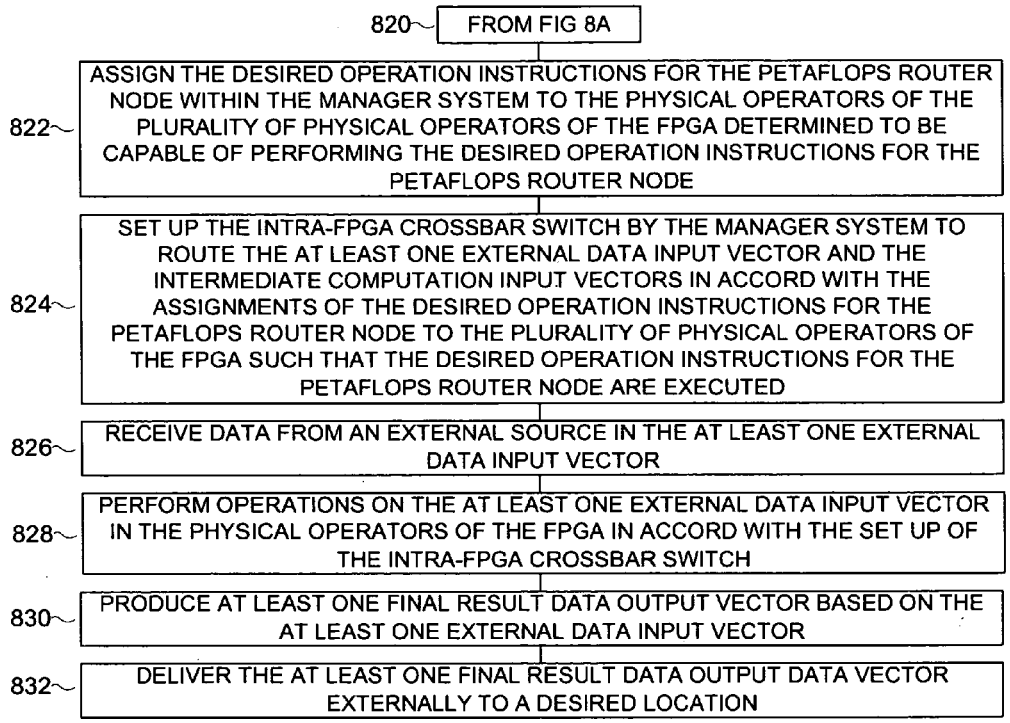

FIGS. 8A and 8B are page one (800) and page two (850) of a process diagram of an embodiment of a PetaFlops Router. Turning first to FIG. 8A, at process 802, create a PetaFlops Router Node comprised of a Field Programmable Gate Array (FPGA). At process 804 implement within the FPGA of the PetaFlops Router Node an intra-FPGA crossbar switch, a plurality of input vector registers, and a plurality of physical operators, each of the plurality of input vector registers being capable of simultaneously reading and writing. At process 806, configure the plurality of physical operators to perform desired arithmetic and logic operations. At process 808, connect the physical operators configured to perform desired arithmetic an logic operations to the intra-FPGA crossbar switch, the intra-FPGA crossbar switch being programmable to configure how data is routed into and out of the plurality of physical operators, including configuring intermediate computations on the at least one external data input vector by routing an output of a first physical operator of the plurality of physical operators of the FPGA into an input of a second physical operator of the plurality of physical operators of the FPGA to create intermediate computation input vectors to the intra-FPGA crossbar switch. At process 810, connect the at least one external data input vector to the intra-FPGA crossbar switch via an input vector register selected from the plurality of vector registers. At process 812, connect the intermediate computation input vectors to the intra-FPGA crossbar switch via additional input vector registers selected from the plurality of input vector registers such that there is an additional input vector register for each intermediate computation input. At process 814, connect a manager system to the intra-FPGA crossbar switch such that the manager system manages operation of the intra-FPGA crossbar switch. At process 816, receive desired operation instructions for the PetaFlops Node at the manager system. At process 818, analyze the desired operation instructions for the PetaFlops Router Node within the manager system to determine which physical operators of the plurality of physical operators of the FPGA are capable of performing the operation instructions. 820 is an off page connector between page one (800) of FIG. 8A and page two (850) of FIG. 8B that together comprise a process diagram of an embodiment of a PetaFlops Router. Turning now to FIG. 8B, at process 822, assign the desired operation instructions for the PetaFlops Router Node within the manager system to the physical operators of the plurality of physical operators of the FPGA determined to be capable of performing the desired operation instructions for the PetaFlops Router Node. At process 824, set up the intra-FPGA crossbar switch by the manager system to route the at least one external data input vector and the intermediate computation input vectors in accord with the assignments of the desired operation instructions for the PetaFlops Router Node to the plurality of physical operators of the FPGA such that the desired operation instructions for the PetaFlops Router Node are executed. At process 826, receive data from an external source in the at least one external data input vector. At process 828, perform operations on the at least one external data input vector in the physical operators of the FPGA in accord with the set up of the intra-FPGA crossbar switch. At process 830, produce at least one final result data output vector based on the at least one external data input vector. At process 832, deliver the at least one final result data output data vector externally to a desired location.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of performing operations on external source data, said method comprising:
   receiving desired instructions by a manager system to be executed by a PetaFlops Node;
   translating said desired instructions by said manager system into specific instructions to be performed by specific components structures within said PetaFlops Node, said PetaFlops Node being comprised of a Field Programmable Gate Array (FPGA), an intra-Field Programmable Gate Array (intra-FPGA) crossbar switch, and a plurality of input vector registers which are interconnected within said PetaFlops Node in order for said PetaFlops Node to receive external source data and output at least one data output vector;
   transferring by said manager system said specific instructions to said FPGA, said intra-FPGA crossbar switch, and said plurality of input vector registers such that said FPGA, said intra-FPGA crossbar switch, and said plurality of input vector registers perform processes comprising:
   receiving external source data by said plurality of input vector registers;
   outputting from said plurality of input vector registers at least one external source data input vector to said FPGA and to said intra-FPGA crossbar switch;
   executing physical operators on said at least one external source data input vector by said FPGA;
   creating intermediate processed results by said FPGA;
   transferring said intermediate processed results to said intra-FPGA crossbar switch;
   switching said intermediate processed results by said intra-FPGA crossbar switch such that at least one output vector is created; and
   outputting said at least one data output vector to a specific location.

2. The method of claim 1 further comprising performing a subset of desired arithmetic and logic operations by at least one dedicated co-processor connected to said FPGA in order to offload said FPGA by performance of said subset of desired arithmetic and logic operations.

3. The method of claim 1 further comprising:
   receiving additional desired instructions by said manager system;
   translating said additional desired instructions by said manager system into additional specific instructions to be performed by said specific component structures within said PetaFlops Node;
   transferring said additional specific instructions from said manager system to said FPGA and to said intra-FPGA crossbar switch;
   executing by said FPGA a first physical operator on said at least one external source data input vector to create at least one intermediate result in accord with said additional specific instructions;
   routing by said intra-FPGA crossbar switch said at least one intermediate result to a second physical operator of said FPGA in accord with said additional specific instructions; and,
   executing by said FPGA said second physical operator in order to create said at least one data output vector in accord with said additional specific instructions.

4. The method of claim 1 further comprising:
   receiving additional desired instructions by said manager system;
   translating said additional desired instructions by said manager system into additional specific instructions to be performed by said specific component structures within said PetaFlops Node;
   transferring said additional desired instructions from said manager system to said FPGA; and
   implementing said additional specific instructions by said FPGA such that said plurality of input vector registers perform as First In First Out (FIFO) registers.

5. The method of claim 1 further comprising:
   receiving additional desired instructions by said manager system;
   translating said additional desired instructions by said manager system into additional specific instructions to be performed by said specific component structures within said PetaFlops Node and by an external crossbar switch, said additional external crossbar switch being interconnected to said manager system and to said intra-FPGA crossbar switch of said PetaFlops Node;
   transferring said additional desired instructions from said manager system to said additional external crossbar switch, said FPGA, and said intra-FPGA cross bar switch,
   routing data by said additional external crossbar switch into and out of said intra-FPGA crossbar switch as well as from said external source data and to said specific location in accord with said additional specific instructions.

6. The method of claim 5 further comprising:
   receiving another set of additional desired instructions by said manager system;
   translating said another set of additional desired instructions by said manager system into another set of additional specific instructions to be performed by said specific component structures within said PetaFlops Node, said external crossbar switch, and at least one additional PetaFlops Node, said at least one additional PetaFlops Node being interconnected to said external crossbar switch which is interconnected to said PetaFlops Node via said intra-FPGA crossbar switch of said PetaFlops Node;
   transferring said another set of additional specific instructions from said manager system to said specific component structures within said PetaFlops Node and within said at least one additional PetaFlops Node as well as to said additional external crossbar switch;
   switching by said intra-FPGA crossbar switch of said PetaFlops Node, by said intra-FPGA crossbar switch of said at least one additional PetaFlops Node, and by said additional external crossbar switch such that said at least one data output vector is created.

7. The method of claim 6 wherein said processes of receiving said desired instructions, receiving said additional desired instructions, and receiving said another set of additional desired instructions by said manager system receives said desired instructions, said additional desired instructions, and said another set of additional desired instructions in a high level language at a converter subsystem of said manager system, said method further comprising:

converting at said converter subsystem of said manner system said desired instructions, said additional desired instructions, and said another set of additional desired instructions into said specific instructions, said additional specific instructions, and said another set of additional specific instructions as machine readable instructions assigned to specific structures within said PetaFlops Node and said at least one additional PetaFlops Node as well as machine readable instructions assigned to said additional external crossbar switch; and, transferring said machine readable instructions from said manager system to said specific component structures within said PetaFlops Node and within said at least one additional PetaFlops Node as well as to said additional external crossbar switch in order to setup said specific component structures within said PetaFlops Node and within said at least one additional PetaFlops Node as well as to setup routing of said additional external crossbar switch.

8. The method of claim 7 wherein said desired operation instructions, said additional desired instructions, and said another set of additional desired instructions received in said high level language are delivered in a widgetized format.

9. The method of claim 7 wherein said process of converting said desired instructions, said additional desired instructions, and said another set of additional desired instructions into said specific instructions, said additional specific instructions, and said another set of additional specific instructions as machine readable instructions, and said process of transferring said machine readable instructions from said manager system to said specific component structures within said PetaFlops Node and within said at least one additional PetaFlops Node as well as to said additional external crossbar switch is performed one instruction at a time such that said conversion and transfer of each instruction is completed before said conversion and transfer of a next instruction is started.

10. The method of claim 1 wherein at least one additional FPGA is interconnected to said intra-FPGA crossbar switch of said FPGA in order to combine with said FPGA to provide additional physical operators for said PetaFlops Node.

11. A PetaFlops Router that performs operations on at least one external data input vector, said PetaFlops Router comprising:

a PetaFlops Node comprised of interconnected internal structures, said interconnected internal structures further comprising:
  a Field Programmable Gate Array (FPGA);
  an intra-Field Programmable Gate Array (intra-FPGA) crossbar switch; and
  a plurality of input vector registers; and, a manager system, said manager system further comprising an instruction subsystem that receives desired operations instructions, translates said desired operation instructions into specific instructions to be performed by said interconnected internal structures within said PetaFlops Node, which results in external source data being converted into at least one data output vector which is output to a specific location;

wherein when said manager system sends said specific instructions to said interconnected internal structures within said PetaFlops Node and when external source data is received by said plurality of input vector registers:

said plurality of input vector registers outputs at least one external source data input vector to said FPGA and said intra-FPGA crossbar switch, said FPGA executes physical operators on said at least one external source data input vector and creates intermediate processed results which are transferred to said intra-FPGA crossbar switch for switching in order to create said at least one data output vector which is output to said specific location.

12. The PetaFlops Router of claim 11 further comprising at least one dedicated co-processor connected to said FPGA in order to offload processing from said FPGA by performing a subset of desired arithmetic and logic operations on said at least one dedicated co-processor.

13. The PetaFlops Router of claim 11 wherein said manager system further receives additional desired instructions, translates said additional desired instructions into additional specific instructions to be performed by said interconnected internal structures within said PetaFlops Node, and transfers said additional specific instructions from said manager system to said FPGA and to said intra-FPGA crossbar switch such that, after said additional specific instructions are received, said FPGA executes a first physical operator on said at least one external source data input vector to create at least one intermediate result in accord with said additional specific instructions, said intra-FPGA crossbar switch routes said at least one intermediate result to a second physical operator of said FPGA in accord with said additional specific instructions, and said FPGA executes said second physical operator in order to create said at least one data output vector in accord with said additional specific instructions.

14. The PetaFlops Router of claim 11 wherein each of said plurality of input vector registers is a First In First Out (FIFO) register.

15. The PetaFlops Router of claim 11 further comprising:
  said additional external crossbar switch being interconnected to said manager system and to said intra-FPGA crossbar switch of said PetaFlops Node; and,
  wherein said manager system further receives additional desired instructions, translates said additional desired instructions into additional specific instructions to be performed by said interconnected internal structures within said PetaFlops Node and by said external crossbar switch, transfers said additional desired instructions from said manager system to said additional external crossbar switch, said FPGA, and said intra-FPGA cross bar switch such that, after said additional specific instructions is received, said additional external crossbar switch routes data into and out of said intra-FPGA crossbar switch as well as from said external source data and to said specific location in accord with said additional specific instructions.

16. The PetaFlops Router of claim 15 further comprising:
  at least one additional PetaFlops Node interconnected to said external crossbar switch, which is interconnected to said PetaFlops Node via said intra-FPGA crossbar switch of said PetaFlops Node; and,
  wherein said manager system further receives another set of additional desired instructions, translates said another set of additional desired instructions into another set of additional specific instructions to be performed by said interconnected internal structures within said PetaFlops Node, said external crossbar switch, and said interconnected internal structures within said at least one additional PetaFlops Node, transfers said another set of additional specific instructions from said manager system to said interconnected internal structures within said PetaFlops Node and within said at least one additional PetaFlops Node as well as to said additional external crossbar switch such that, after said another set of additional specific instructions is received, said intra-FPGA crossbar switch of said PetaFlops Node, said intra-FPGA crossbar switch of said at least one additional PetaFlops Node, and said additional external crossbar switch perform switching that creates said at least one data output vector.

17. The PetaFlops Router of claim 16 wherein said manager system further comprises:

a converter subsystem that receives said desired instructions, said additional desired instructions, and said another set of additional desired instructions in a high level language, converts said desired instructions, said additional desired instructions, and said another set of additional desired instructions into said specific instructions, said additional specific instructions, and said another set of additional specific instructions as machine readable instructions assigned to specific structures within said PetaFlops Node and said at least one additional PetaFlops Node as well as machine readable instructions assigned to said additional external crossbar switch, transfers said machine readable instructions from said manager system to said specific component structures within said PetaFlops Node and within said at least one additional PetaFlops Node as well as to said additional external crossbar switch in order to setup said specific component structures within said PetaFlops Node and within said at least one additional PetaFlops Node as well as to setup routing of said additional external crossbar switch.

18. The PetaFlops Router of claim 17 wherein said desired operation instructions, said additional desired instructions, and said another set of additional desired instructions received in said high level language are delivered in a widgetized format.

19. The PetaFlops Router of claim 17 wherein said conversion of said desired instructions, said additional desired instructions, and said another set of additional desired instructions into said specific instructions, said additional specific instructions, and said another set of additional specific instructions to machine readable instructions by said converter subsystem of said manager system, and said transfer of said machine readable instructions from said manager system to said specific component structures within said PetaFlops Node and within said at least one additional PetaFlops Node as well as to said additional external crossbar switch is performed one instruction at a time such that said conversion and transfer of each instruction is completed before said conversion and transfer of a next instruction is started.

20. The PetaFlops Router of claim 11 wherein said PetaFlops Node further comprises at least one additional FPGA interconnected to said intra-FPGA crossbar switch of said FPGA in order to combine with said FPGA to provide additional physical operators for said PetaFlops Node.

* * * * *